Nov. 7, 1933.  W. PAGE  1,934,206
FLUID OPERATIVE CONTROL
Filed April 22, 1930   2 Sheets-Sheet 1
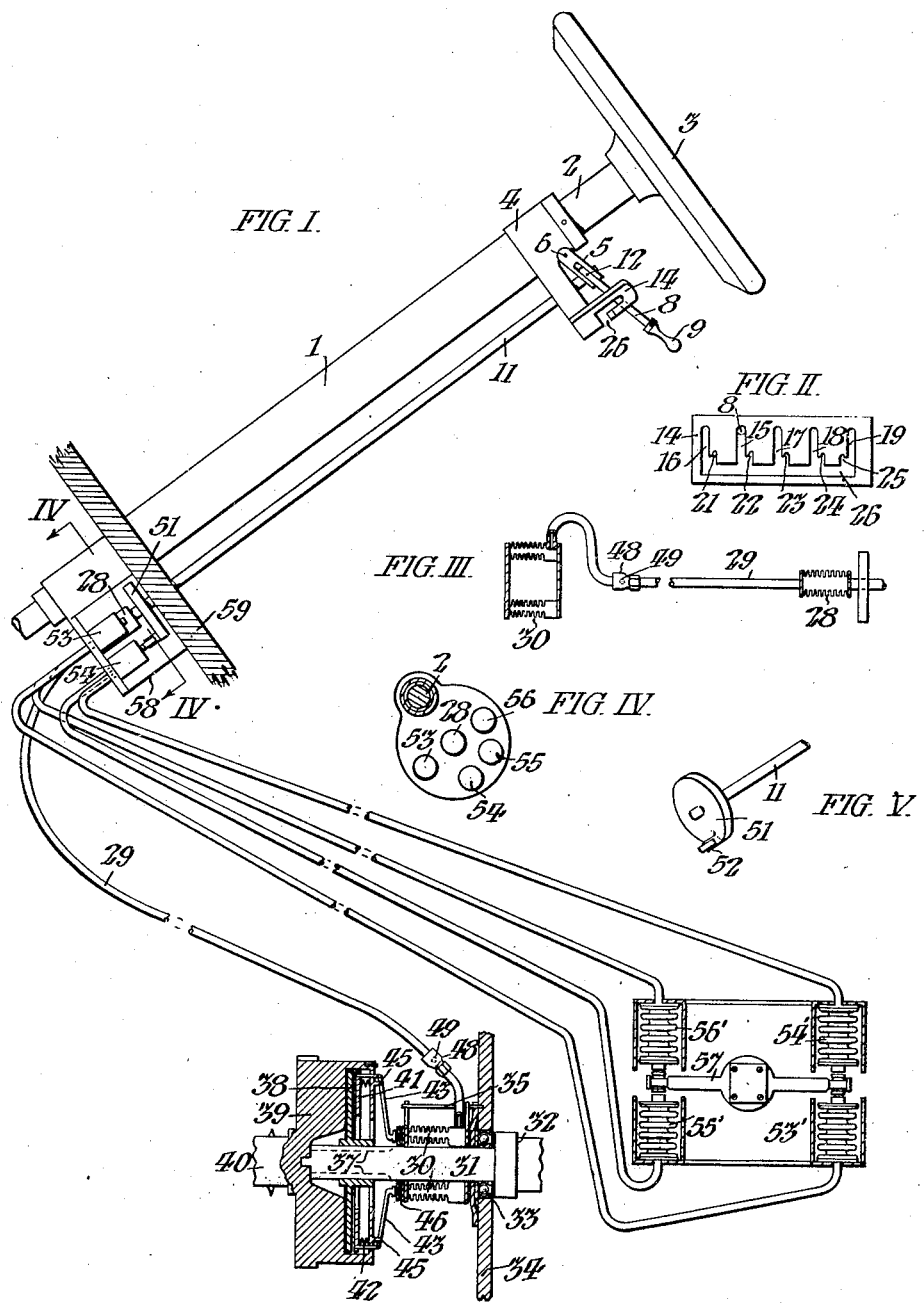
INVENTOR:
WILLIAM PAGE, Nov. 7, 1933.　　　W. PAGE　　　1,934,206
FLUID OPERATIVE CONTROL
Filed April 22, 1930　　　2 Sheets-Sheet 2
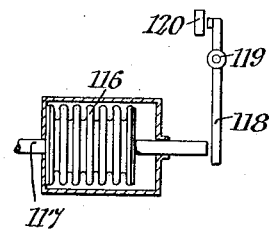
FIG. X.
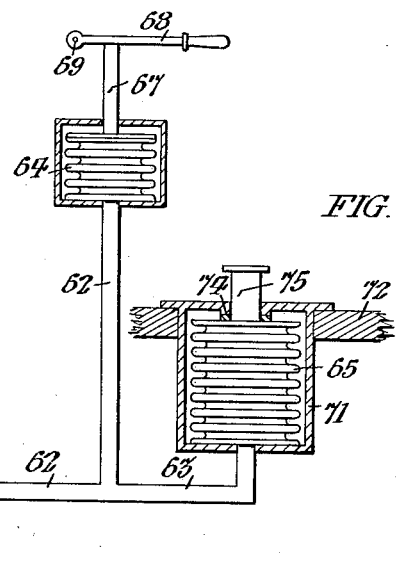
FIG. VI.
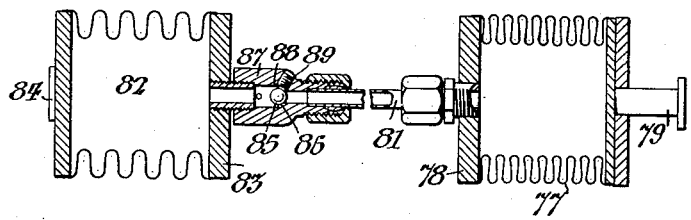
FIG. VII.
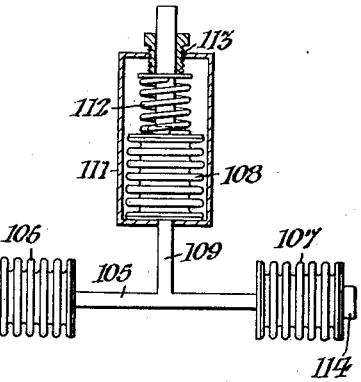
FIG. IX.
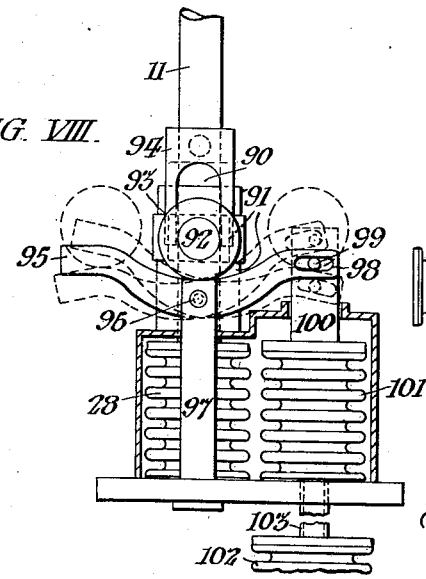
FIG. VIII.
INVENTOR:
WILLIAM PAGE, Patented Nov. 7, 1933

1,934,206

UNITED STATES PATENT OFFICE 1,934,206

FLUID OPERATIVE CONTROL

William Page, Philadelphia, Pa.

Application April 22, 1930. Serial No. 446,269

2 Claims. (Cl. 60—54.5)

The purpose of the invention is to substitute for the ordinary mechanical controlling means including foot pedals and means connecting them with the clutch, gear changing, and brake mechanism; a hand lever local to the steering wheel, and a fluid conduit connecting the same with the mechanism to be controlled, with the advantage of not only avoiding the obstruction of the floor space in front of the operator's seat by the controlling devices, but permitting the desired control to be effected with less muscular exertion than is required by said ordinary mechanical controlling devices.

As thereinafter described, the preferred embodiment of my invention includes a fluid conduit having collapsible bellows at each end thereof forming a sealed system containing a mobile liquid which does not freeze at ordinary winter temperatures, whereby deformation of a bellows local to the operator effects deformation of a bellows remote from the operator to effect the desired control by displacement of said fluid within the system.

As hereinafter described; the mobile fluid within the system may be displaced solely under control of a lever whereby one of the bellows is deformed, and immediately resume its normal position when released from the abnormal pressure upon the bellows thus deformed, or, the system may include a check valve adapted to control the replacement of the mobile fluid to its normal position after release of the deformed bellows. The latter embodiment of my invention is particularly adapted for controlling a motor clutch, to prevent the grabbing when the clutch is released, which is characteristic of mechanical controlling means.

As hereinafter described, a single operating lever may be used in conjunction with a plurality of such conduits respectively provided with bellows at opposite ends thereof, to effect a plurality of controlling operations by means of a single manually operative lever; for instance, to release the clutch, apply the brakes, shift the gears, and restore the clutch to its operative position, or, a single such fluid conduit and its appurtenances may be utilized to effect a plurality of controls.

As hereinafter described; such bellows may be tubes of thin metal having a plurality of axially spaced circumferential corrugations. However, suitable bellows may be otherwise formed and, in some instances, cylinders and pistons may be substituted for bellows.

My invention includes the various novel features of construction and arrangement hereinafter more definitely specified.

In said drawings; Fig. I is a diagram of an automobile steering column and its appurtenances embodying this invention, adapted to be manipulated by a single lever. Fig. II is a plane development of the arcuate guide plate for said lever, indicated in Fig. I. Fig. III is a detached, somewhat diagrammatic view, of the fluid controlling system for the clutch, indicated in Fig. I, and including a check valve adapted to retard replacement of the fluid to its normal position. Fig. IV is a fragmentary sectional view taken on the line IV, IV, in Fig. I, showing the grouped arrangement of a plurality of separate fluid controlling systems; whereby they are adapted for coordinate operation by the single lever shown in Fig. I. Fig. V is a fragmentary perspective view of the axially reciprocatory and rotary plunger and the cam at the lever end thereof, indicated in Fig. I, adapted for coordinate operation of the plurality of controlling devices indicated in Fig. IV. Fig. VI is a diagrammatic view of a fluid controlling system adapted for alternative operation by hand or foot power. Fig. VII is a diagrammatic view of a fluid controlling system adapted to be operated by foot power and including a check valve adapted to retard the replacement of the fluid to its normal position. Fig. VIII is a diagrammatic view of a modified form of the controlling apparatus shown in Fig. I, and including an auxiliary lever whereby the bellows at the initial end of the system may be deformed by either compressing or expanding it; whereby a plurality of controlling functions may be effected by a single such fluid system. Fig. IX is a diagrammatic view of a modified form of clutch controlling apparatus, including a pressure regulator. Fig. X is a diagrammatic view of controlling apparatus including a bellows in cooperative relation with a lever.

Referring to the form of my invention shown in Figs. I to V inclusive; the stationary steering column 1 has the steering shaft 2 mounted to turn therein and provided with the steering wheel 3 at the top thereof. The bracket 4, which is rigidly connected with said steering column 1, has the lever 5 fulcrumed at 6 therein. Said lever 5 carries the lever arm 8 provided with the handle 9 which is pivoted therein at the axis of the rod 11 to which it is pivotally connected by the pin 12 so that said rod may be reciprocated axially by movement of said arm 8 upon the fulcrum 6, or be turned upon its axis in said lever 5. Said rod 11 may be held in different positions of rotary adjustment by the arcuate guide plate 14 which, as indicated in the plane development thereof shown in Fig. II, has the slot 15 at the top of which said lever arm 8 normally rests when the mechanism is in neutral position, with the clutch engaged. The slot 16 positions said lever arm 8 for reverse operation of said automobile, and the slots 17, 18, and 19 hold said lever respectively in position for engagement in first, second, or third gear. Said slots 16, 15, 17, 18, and 19 have respective notches 21, 22, 23, 24, and 25 at the lower ends thereof in which said lever arm 8 may be detained with the clutch disengaged by the means hereinafter described. The longitudinal slot 26 in said guide plate 14 permits said arm 8 to shift the gears to any selected position or condition represented by said slots in said plate. Said rod 11 is adapted to compress the bellows 28 which is connected by the fluid conduit 29 with the bellows 30. Said bellows 30 is a hollow tube formed of two concentric corrugated sheet metal tubes encircling the shaft 31 of the main drive gear 32. Said shaft is journaled in the bearing 33 in the wall 34 of the transmission gear casing which has the stationary stud 35 engaging said bellows 30 and absorbing the stresses upon the latter tending to rotate it. Said shaft 31 has a circular series of splines 37 engaging the clutch disk 38 which is normally frictionally engaged with the fly wheel 39 on the crank shaft 40; such engagement being effected by the compression plate 41 under pressure of the springs 42. Said clutch may be released by withdrawing said compression plate 41 to the right in Fig. I, and such movement is effected by the levers 43 which are fulcrumed at 45 and adapted to be rocked by the thrust bearing 46 when the latter is thrust to the left in Fig. I by expansion of said clutch bellows 30 to the position shown in Fig. I.

With the clutch operating bellows 30 in the position shown in Fig. I, if the lever arm 8 be shifted to the position shown in that figure, the collapse of the bellows 30 and consequent release of the levers 43 to permit the springs 42 to again frictionally engage the disk 38 with the fly wheel 39, would be effected so quickly that the clutch would grab, if it were not for the fact that said conduit 29 includes the check valve 48, the essential element of which is the ball 49 which, when the bellows 28 is compressed to force the fluid into the bellows 30 to expand it, moves to the left in Fig. III in its casing to permit the fluid to flow freely past it. However, when pressure upon the bellows 28 is released by the movement of the lever 8 to the position shown in Fig. I, said ball 49 shifts to the opposite side of its casing, as indicated in Fig. I, to retard the return of the fluid from the bellows 30 to permit the collapse of the latter and thus retard the operation of resuming frictional engagement of the clutch with the fly wheel 39; thus avoiding the grabbing effect which is characteristic of the mechanically operative clutch controlling means of the prior art when thus suddenly released.

Said axially reciprocatory and rotary rod 11 carries at its lower end the cam disk 51 having the single cam projection 52 which, by turning movement of said rod, is adapted to register with any selected one of the arcuate series of bellows 53, 54, 55, and 56 which are disposed in a semicircle concentric with said bellows 28, as indicated in Fig. IV. Said bellows are respectively at the initial ends of closed conduit systems having bellows 53', 54', 55', and 56', at the opposite ends thereof adapted to be deformed by deformation of the initial bellows, and in operative relation with the gear changing lever 57. Said bellows 53 when compressed is thus adapted to effect a change of the gears to effect reverse operation of the automobile, and said bellows 54, 55, and 56 when deformed by said cam 52 are adapted to effect the movement of the change gears to the first, second, and third speed positions above contemplated.

I find it convenient to mount all of said bellows 28, 53, 54, 55, and 56 in the single casing 58 beneath the floor board 59 of the automobile. However, they may be otherwise located.

For instance, I have shown in Fig. VI a fluid operative control for an automobile brake member 60 or other movable element with which the bellows 61 may be cooperatively related. Said bellows 61 is connected by the conduits 62 and 63 with respective bellows 64 and 65, which may be respectively operable by hand and by foot power to deform said bellows 61. For instance, said bellows 64 has the plunger 67 rigidly connected with the upper end thereof and in cooperative relation with a hand lever 68 which is fulcrumed at 69 so that, when said lever is depressed, it collapses the bellows 64, compresses the mobile fluid in the system and distends the bellows 61 so as to move said element 60 to the left in Fig. VI. The arrangement is such that the aforesaid deformation of the bellows 64 does not affect the bellows 65 which is, of course, subjected to the same fluid pressure as the bellows 61; because said bellows 65 is mounted in the casing 71 which prevents it from thus expanding. Said casing 71 may be conveniently mounted in the floor 72 of an automobile, where it is accessible to the foot of the operator, and has the bearing 74 for the plunger 75 which is rigidly connected with the upper end of said bellows 65 so that the latter may be collapsed by foot power, alternately or simultaneously with the operation of the bellows 64 to deform said bellows 61 and operate the element 60, as above described.

As shown in Fig. VII, a system in accordance with my invention may include the bellows 77 supported by the abutment 78 and having the plunger 79 by which it may be collapsed, manually or by foot power, or otherwise. Said system includes the conduit 81 leading to the bellows 82 which is supported at one end by the abutment 83 and adapted to move the element 84, at its other end, when said bellows 77 is collapsed, as aforesaid. The effective area of said conduit 81 is controlled by the check valve conveniently comprising the ball 85 which is adapted to fit the seat 86 in the casing 87, but which has a variable bypass 88 afforded by the screw opening into said seat which may be more or less obstructed in accordance with the position of the adjustable screw 89. The effect of such construction and arrangement is that although the bellows 82 responds instantly to compression of the bellows 77 and is thus immediately effective upon the element 84 to move the latter; the return of said bellows 82 to its normal position may be delayed more or less in accordance with the adjustment of said bypass screw 89. As above contemplated, such an embodiment of my invention as shown in Fig. VII is adapted for operation of an automobile clutch to prevent any grabbing action of the latter.

As indicated in Fig. VIII, the axially reciprocatory and rotary rod 90 extends through the stationary bearing sleeve 91 on which is fulcrumed the lever 92, which carries the cam roller 93. Said rod carries the fork 94 embracing said lever 92; whereby said roller 93 may be shifted in cooperative relation with the lever 95, which latter is arcuate to register with said roller 93 as said rod 90 is turned. Said lever 95 is fulcrumed at 96 upon the support 97 and has the slot 98 engaging the cross pin 99 on the plunger 100 of the bellows 101 so that said bellows 101 may be distorted by either compressing it or distending it, with the effect of distending or retracting the bellows 102 with which said bellows 101 is connected by the fluid conduit 103 charged with fluid as above contemplated. Such fluid may be oil or a mixture of oil and alcohol, or a mixture of glycerin and alcohol, or any substance which will remain mobile when subjected to the lowest winter temperature.

In Fig. IX; the system including the conduit 105 having the driving and driven bellows 106 and 107 at respectively opposite ends thereof, includes the pressure regulating bellows 108, conveniently in communication with said conduit 105 through the branch 109 between said bellows 106 and 107. Said bellows 108 is mounted in the casing 111 and is continually acted upon by the spring 112, the stress of which is variable by axial adjustment of the screw 113. Such a system may be advantageously employed to shift the gear changing element 114 without damage to the gears, because if the teeth of the gears are momentarily presented in such opposition that they will not mesh; said bellows 108 and spring 112 yield under the abnormal pressure upon the bellows 106, until the gear teeth are in position to mesh, whereupon said spring 112 returns the bellows 108 to its normal position shown, with consequent distention of the bellows 107 and proper engagement of the gears. Such a system as shown in Fig. IX may also include a check valve such as above described, arranged and adapted to retard the return of the fluid in the system after its displacement.

Although I have shown most of the driven bellows aforesaid in direct engagement with the automobile element which is to be moved; it is to be understood that any suitable power modifying device may be interposed between such bellows and elements. For instance, in Fig. X, the bellows 116 which may be driven by fluid pressure through the conduit 117 is adapted to shift the lever 118 which is fulcrumed at 119 and in cooperative relation with the automobile element 120 which may be thus moved in a direction opposite to the movement of the bellows 116, and to a less extent than the bellows 116.

As above noted; cylinders and pistons may be substituted for bellows in closed systems such as above described. Moreover, it is obvious that various modifications may be made in the details of construction, arrangement, and method of procedure above described without departing from the essential features of my invention, as defined in the appended claims.

I claim:

1. In fluid operative controlling apparatus, the combination with a lever fulcrumed intermediate of its length; of pairs of resilient bellows respectively in cooperative relation with the opposite ends of said lever, for turning the latter; a conduit extending from each of said four bellows and each provided with fluid compressing means at its end remote from said lever bellows; said fluid compressing means being disposed in a group; a cam element having an eccentric projection for selective registry with said fluid compressing means; and means for turning and reciprocating said cam element to actuate selectively said fluid compressing means to turn said lever at will; whereby said fluid compressing means may be selectively actuated to turn said lever at the will of the operator, and said cam element be automatically restored to its initial axial position, by the resilience of said bellows, when released.

2. Apparatus as in claim 1, wherein said cam element has an axial projection; an axial fluid compressing device in registry with said axial projection; another resilient bellows; and a conduit connecting the latter bellows with said axial fluid compressing device; whereby whenever said cam element is moved axially, to actuate selectively said fluid compressing means to turn said lever at will, said axial compressing device is actuated, in either direction, in one direction manually and in the opposite direction by the resilience of said bellows when released, in sequential coordinated relation with all of said bellows.

WILLIAM PAGE.